United States Patent [19]
Becker

[11] Patent Number: 4,955,603
[45] Date of Patent: Sep. 11, 1990

[54] BARBELL WEIGHT LOCK

[76] Inventor: Hermann J. Becker, Theodor-Heuss-Allee 18, D-5500 Trier, Fed. Rep. of Germany

[21] Appl. No.: 347,972

[22] Filed: May 5, 1989

[30] Foreign Application Priority Data

May 6, 1988 [DE] Fed. Rep. of Germany ....... 3815524

[51] Int. Cl.⁵ .................................... A63B 21/075
[52] U.S. Cl. .................................... 272/123; 403/259; 411/433
[58] Field of Search ............. 272/117, 122, 123, 124; 403/259, 261, 328; 411/433, 267, 268, 269, 935; 269/181

[56] References Cited

U.S. PATENT DOCUMENTS

| | | | |
|---|---|---|---|
| 2,640,696 | 6/1953 | Lemieux | 272/123 |
| 2,796,296 | 6/1957 | Watson | 272/123 |
| 4,638,994 | 1/1987 | Gogarty | 272/122 |
| 4,768,780 | 9/1988 | Hayes | 272/122 |
| 4,773,641 | 9/1988 | Metz | 272/123 |
| 4,787,629 | 11/1988 | DeMyer | 272/123 |

FOREIGN PATENT DOCUMENTS

| 629735 | 2/1927 | France | 272/123 |
|---|---|---|---|
| 12843 | of 1912 | United Kingdom | 272/123 |

Primary Examiner—Robert W. Bahr
Attorney, Agent, or Firm—Ward Brown; Robert W. Beach

[57] ABSTRACT

Externally threaded opposite end portions of the bar of a barbell are insertable into the central apertures of cylindrical weights. Locking sleeves having manually retractable inward-projecting locking pins are fittable on the externally threaded bar end portions. With a locking pin in its projected position, the locking sleeve can be rotated like a conventional nut so as to advance toward or away from the weights. With the locking pin held in a retracted position, the locking sleeve can slide longitudinally in either direction along the threaded bar end portion without rotating.

16 Claims, 6 Drawing Sheets

BARBELL WEIGHT LOCK

BACKGROUND OF THE INVENTION

1. Field of the Invention

The present invention relates to barbells.

2. Prior Art

In a conventional barbell construction, the weights are slid onto the ends of the supporting bar and are normally secured in position by locking mechanism. In known constructions, changing the weights can be time-consuming.

SUMMARY OF THE INVENTION

The principal object of the present invention is to provide a barbell having a novel locking mechanism for the weights that allows the weights to be changed quickly and easily, but which will normally maintain the weights reliably in position.

In the preferred embodiment of the present invention, the foregoing object is accomplished by providing a barbell having a bar component with a screw thread at each of its opposite ends and a locking sleeve including a manually retractable inward-projecting locking pin for engaging in the screw thread groove. With the pin in its projected position, the locking sleeve can be rotated like a conventional nut. With the pin retracted the locking sleeve can slide longitudinally along the threaded bar end portion without rotating.

DETAILED DESCRIPTION

Figure 1:
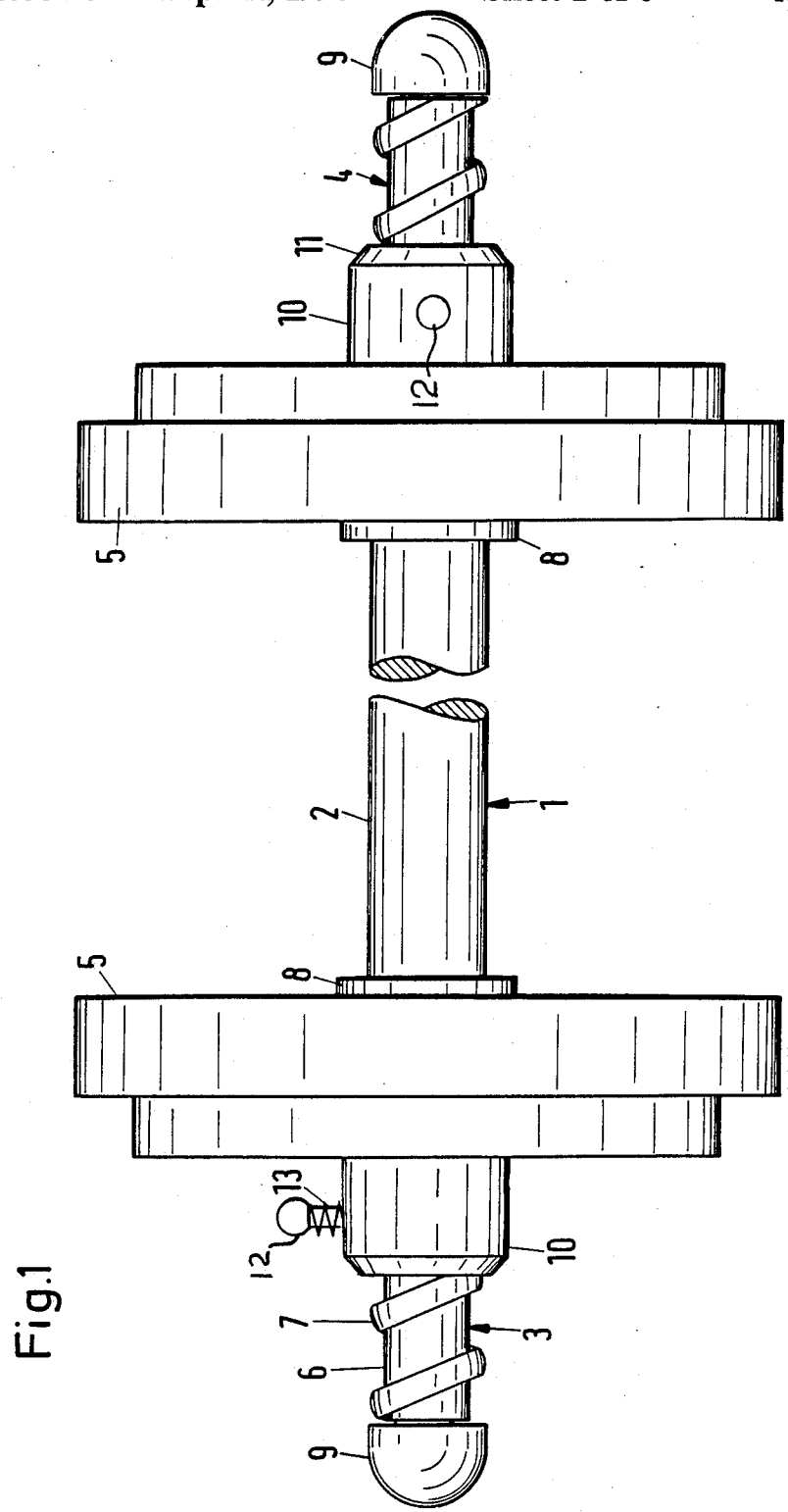
FIG. 1 is a side elevation of a barbell with improved weight lock in accordance with the present invention, including the bar component, cylindrical weights and locking sleeve for normally maintaining the weights in position.

With reference to FIG. 1, a barbell with improved weight lock in accordance with the present invention includes an elongated bar component 1 having a central portion 2 forming a grip or handle. Cylindrical weights 5 can be inserted over the opposite ends 3 and 4 of the bar component 1 into engagement with stops 8 fixed to the central handle portion 2. Preferably, the bar end portions 3 and 4 on which the weights 5 are received are rotatable relative to the central handle portion 2. The weights are normally held in position engaged against the stops 8 by cylindrical locking sleeves 10 inserted over the end portions 3 and 4.

Figure 2:
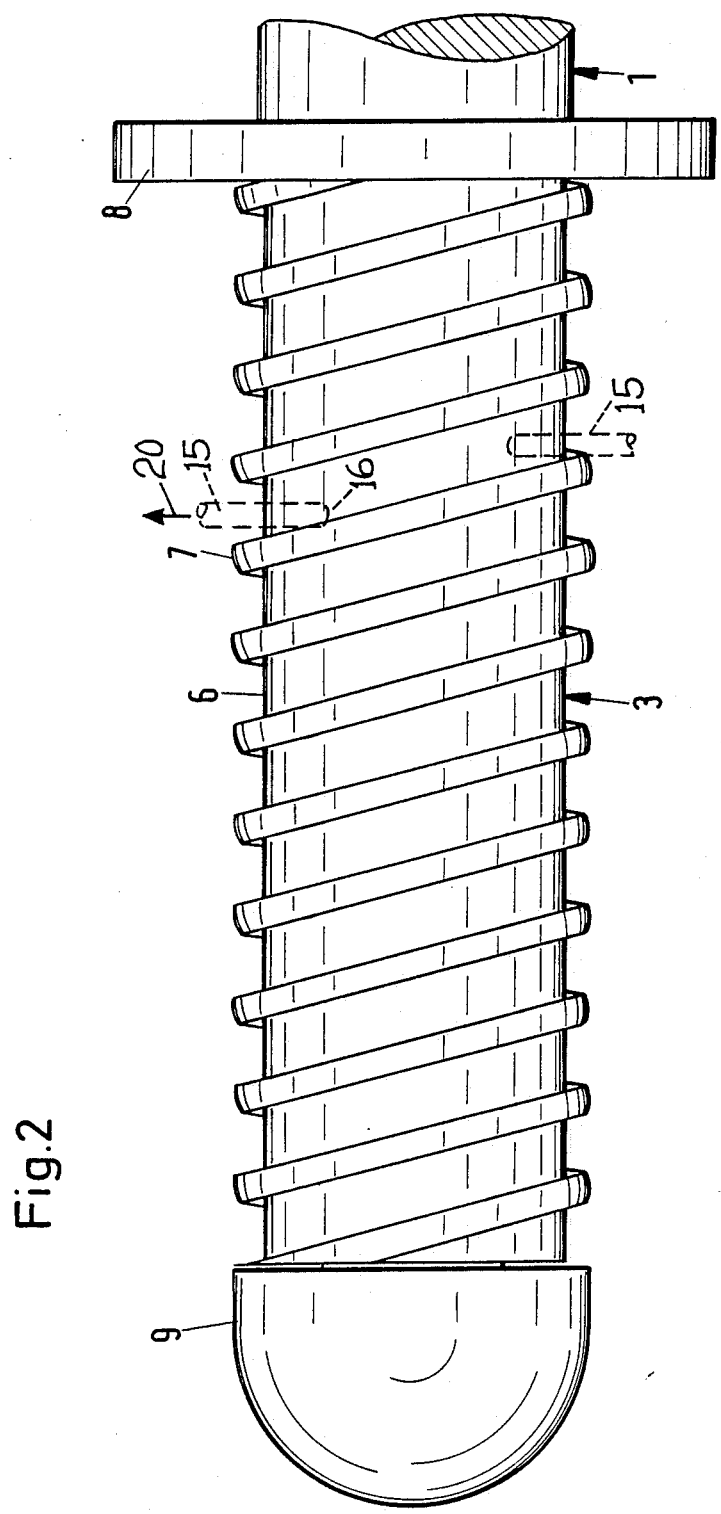
FIG. 2 is an enlarged fragmentary elevation of an end portion of a bar component of a barbell with improved weight lock in accordance with the present invention with the weights and locking sleeve removed.

The end portions 3 and 4 of the bar component 1 are identical. As best seen in FIG. 2, each end portion has a screw thread formed by a continuous helical rib 7. The spacing between adjacent turns of the rib 7, i.e., the width of the continuous helical groove 6 between ribs is approximately twice the axial dimension of the rib 7. The screw thread extends inward to the larger diameter stop 8. At the outer end, the screw thread ends at a substantially hemispherical cap 9 forming a blunt tip. The maximum diameter of the cap 9 is approximately equal to the maximum diameter of each bar end portion 3 or 4, i.e., the outer periphery of the cap is approximately aligned with a cylinder tangential to the periphery of the helical rib 7.

Figure 4:
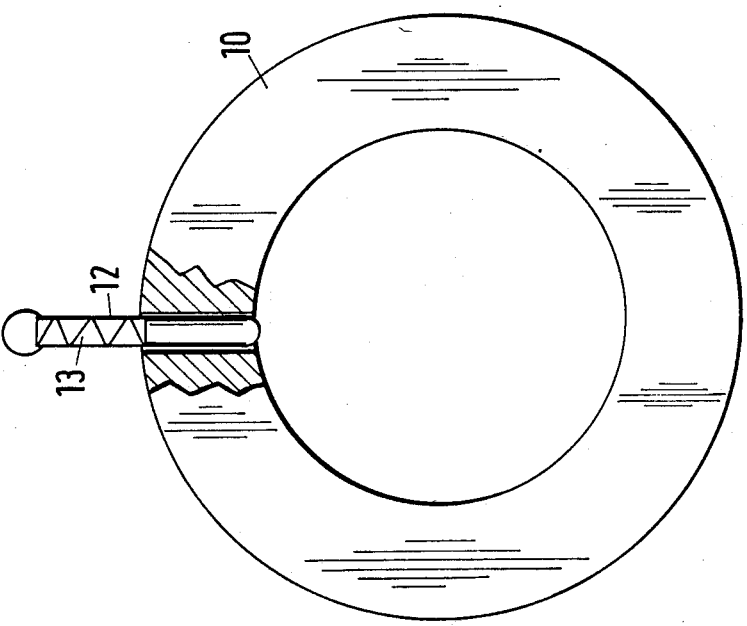
FIG. 4 is a corresponding end elevation of the locking sleeve of FIG. 3 with parts broken away and parts in different positions.
Figure 3:
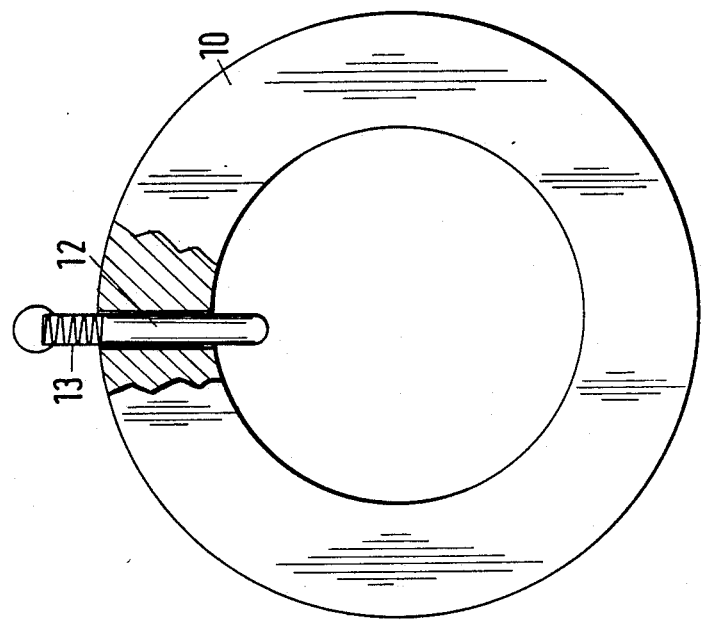
FIG. 3 is a somewhat diagrammatic end elevation of a locking sleeve of the barbell of FIG. 1 with parts broken away.

With reference to FIGS. 3 and 4, the locking sleeve 10 has a central bore slightly larger than the maximum diameter of the bar end portions. A locking pin 12 is slidably received in a radial slot through the sleeve 10. The locking pin is biased inward to the position shown in FIG. 3 by a spring 13. In such position, the inner end portion of the pin 12 projects a substantial distance into the central bore of the sleeve 10. The sleeve can be quickly slid along the threaded bar end portion by pulling the pin outward to the position shown in FIG. 4 in which the inner end of the pin will not engage against a side of the helical rib of the screw thread. Thereafter, the pin is released and the sleeve can be tightened like a conventional nut so that the weights are clamped tightly between the locking sleeve 10 and the corresponding stop 8, as seen in FIG. 1. To remove the weights, the locking sleeve can be loosened slightly so that there is no resistance to retraction of the locking pin 12, thereby permitting axial sliding movement of the locking sleeve off the end portion of the bar component without turning.

Figure 6:
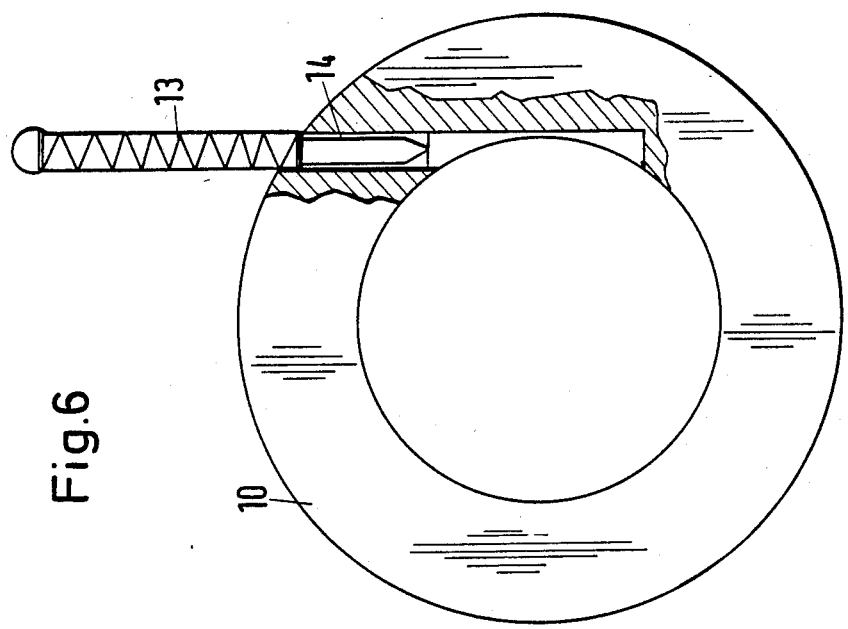
FIG. 6 is a corresponding end elevation of the sleeve of FIG. 5 with parts broken away and parts in different position.
Figure 5:
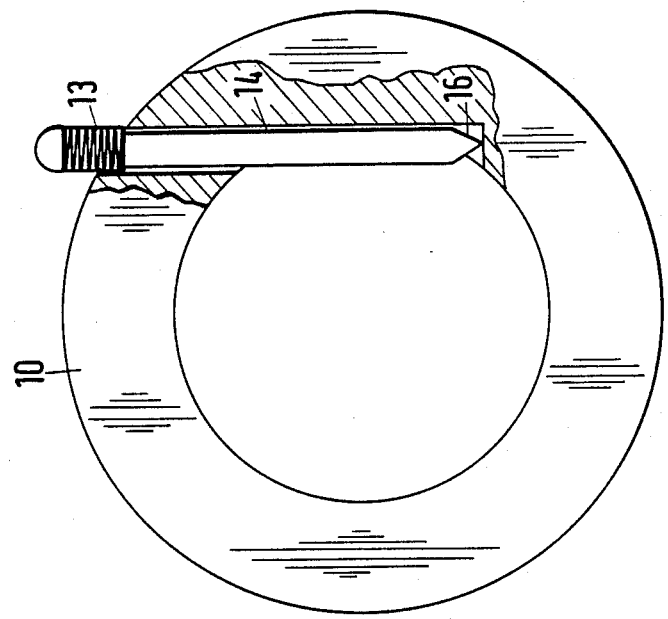
FIG. 5 is a somewhat diagrammatic end elevation of a modified form of locking sleeve with parts broken away.

In the embodiment shown in FIGS. 5 and 6, the locking pin 14 is biased inward by a tension spring 13 through a slot extending substantially tangentially to the central bore of the locking sleeve 10. For axial sliding movement of the locking sleeve along the bar end portion, the pin can be retracted to the position shown in FIG. 6, whereas for tightening or loosening rotation of the sleeve, the pin is disposed in the position shown in FIG. 5 where its inner end portion will engage in the helical screw thread groove.

Figure 8:
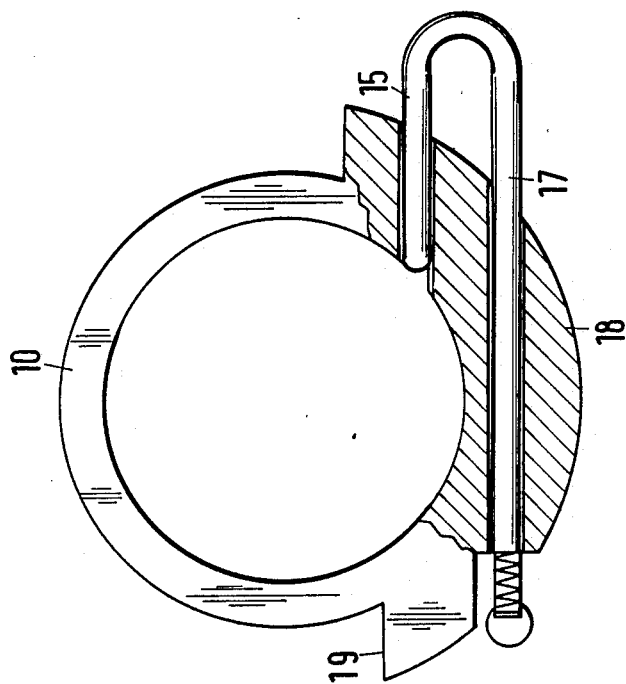
FIG. 8 is a corresponding end elevation of the sleeve of FIG. 4 with parts broken away and parts in different positions.
Figure 7:
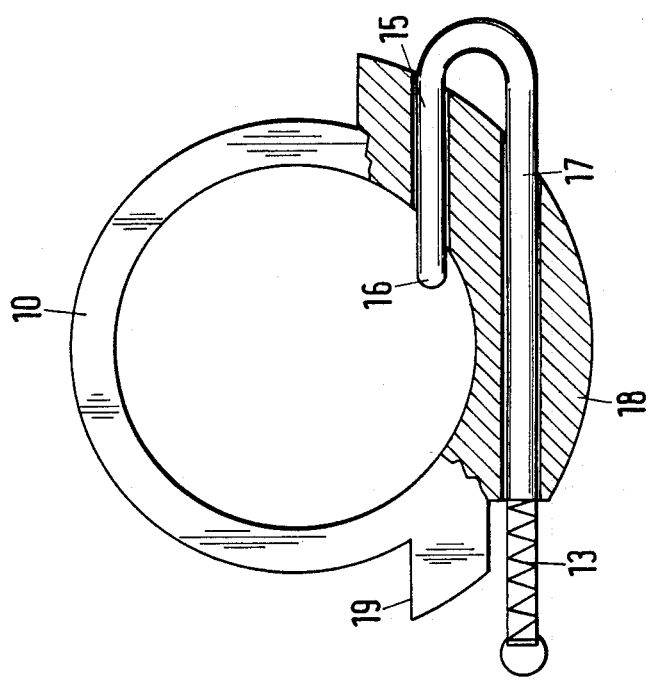
FIG. 7 is a somewhat diagrammatic end elevation of another modified locking sleeve in accordance with the present invention with parts broken away.

In the embodiment shown, in FIGS. 7 and 8, the locking pin has a return bend and includes an outer portion 17 extending through an enlargement 18 of the locking sleeve and an inner portion 15 including a rounded or pointed inner end portion or tip 16. A compression spring 13 normally biases the locking pin to the position shown in FIG. 3 in which the tip extends a substantial distance into the bore of the locking sleeve for engagement in the helical groove of the bar component end portion. The pin can be moved manually to the position shown in FIG. 4 in which the tip 16 is retracted into the sleeve so as to permit longitudinal sliding movement of the sleeve along the bar end portion. The shoulders 19 of the enlargement 18 provide a convenient grasping surface for turning the locking sleeve.

With reference to FIG. 2, it is important that the locking pin be oriented correctly with respect to the screw thread. For example, if the inner portion 15 of the pin extends inward through the locking sleeve and alongside the bar end portion 3 as indicated in broken lines toward the top of FIG. 2, then, as the sleeve is tightened, the inner end 16 of the pin may be wedged outward by the leading side of the helical rib 7 as indicated by the arrow 20. Consequently, in the configuration shown in FIG. 2, it is preferred that the inner portion 15 of the pin be oriented as indicated toward the bottom of FIG. 2 such that, when the locking sleeve is tightened, the inclined rib 7 does not tend to apply an outward-directed force to the pin. With reference to FIG. 1, the outside end of the locking sleeve 10 can have a bevel 11 to indicate the proper orientation of the sleeve on the bar end portion.

Figure 9:
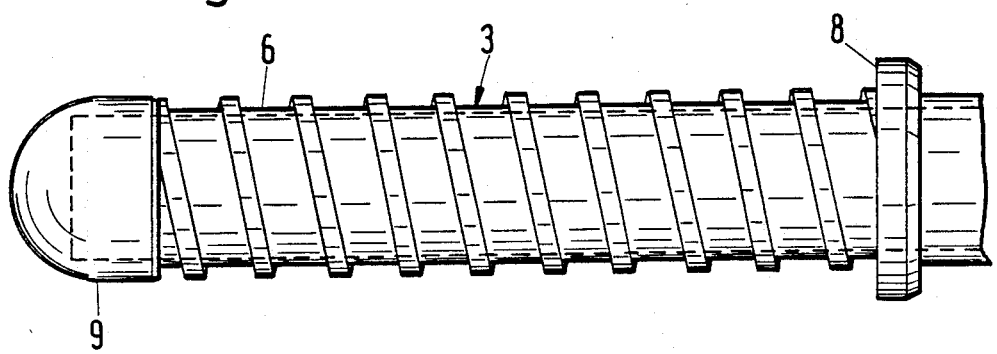
FIG. 9 is a fragmentary side elevation of an end portion of a modified bar component in accordance with the present invention, with the weights end locking sleeve deleted.
Figure 10:
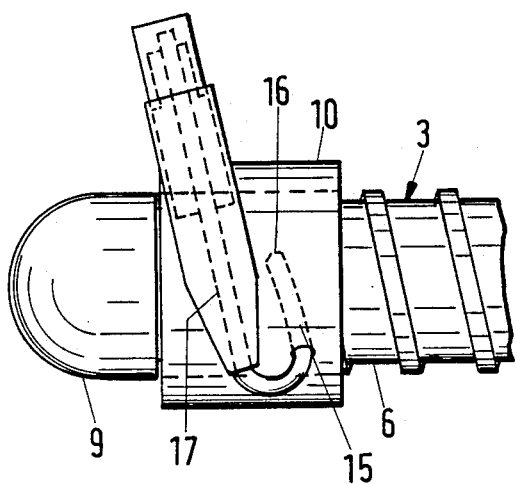
FIG. 10 is a side elevation of the end portion of the bar component of FIG. 9 with a further modified locking sleeve received on such bar component end portion.
Figure 11:
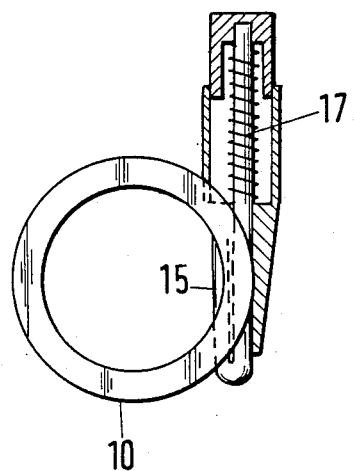
FIG. 11 is a somewhat diagrammatic end elevation of the locking sleeve shown in FIG. 10 with parts broken away.

The embodiment shown in FIGS. 9, 10 and 11 is similar to the embodiment shown in FIGS. 7 and 8 in that the locking pin has a return bend and includes an outer portion 17 and an inner portion 15 for projecting into the central bore of the locking sleeve. In the embodiment shown in FIGS. 10 and 11, however, the inner portion 15 is angled inward and rearward to the same degree as the angle of the screw thread so that the inner end portion of the locking pin extends substantially parallel to the leading face of the screw thread rib 7. A larger section of the locking pin will engage in the screw thread groove 6 for a more secure and reliable fit.

For each embodiment, it is preferred that the portion of the locking pin projectable into the bore of the locking sleeve be pointed or rounded and that the width of the screw thread groove be greater than the width of the scre thread rib for reliable guiding of the pin into a groove without jamming. In addition, preferably the thread rib has a rounded outer side, as shown in FIG. 2, to guide the pin longitudinally of the bar into a groove.

I claim:

1. In a barbell having an elongated bar component including a central handle portion and opposite end portions, weights slidable onto the end portions of the bar component, and stops disposed, respectively, between the end portions of the bar component and the central handle portion for limiting inward sliding movement of the weights along the bar component end portions, each end portion of the bar component having an external screw thread, and locking sleeves fittable over and adjustable longitudinally along the externally threaded end portions of the bar component, the improvement comprising at least one of the locking sleeves having a locking pin including an inner portion slidable transversely of its bar component end portion between a first position fitted in the groove of the screw thread for tightening and loosening rotation of said sleeve and a second position removed from said groove permitting longitudinal sliding of said sleeve along its bar compoennt end portion without rotation toward and away from the adjacent stop, said locking pin having an outer portion accessible from the exterior of the sleeve for selective manual movement of the locking pin inner portion between its first and second positions.

2. In the barbell defined in claim 1, the groove of each screw thread being wider than its rib.

3. In the barbell defined in claim 2, the width of the groove of each screw thread being approximately twice the width of the rib of the screw thread.

4. In the barbell defined in claim 3, the outer periphery of the rib of the screw thread being rounded.

5. In the barbell defined in claim 1, the improvement further comprising spring means for biasing the locking pin inner portion to its first position.

6. In the barbell defined in claim 1, the inner portion of the locking pin being pointed.

7. In the barbell defined in claim 1, the locking pin beign elongated and having a return bend between its inner and outer portions.

8. In the barbell defined in claim 1, the inner portion of the locking pin projectable into the screw thread groove extending parallel to the screw thread ridge.

9. In the barbell defined in claim 1, the locking pin inner portion being slidable generally tangentially of the end portion of the bar compoennt between its first and second positions.

10. In the barbell defined in claim 9, the locking sleeve having an enlargement including an abrupt shoulder, and the locking pin being guided for movement in said enlargement.

11. In the barbell defined in claim 1, the locking sleeve being generally cylindrical and having a beveled end portion for orienting the sleeve relative to the bar component end portion.

12. In the barbell defined in claim 1, the locking pin projecting into the screw thread groove from a direction so as not to be wedged outward by engagement against the screw thread rib when turned in a tightening direction.

13. In the barbell defined in claim 1, each end portion of the bar component having a rounded cap portion at its outer tip.

14. In the barbell defined in claim 1, the threaded end portions of the bar component being rotatable relative to the central handle portion.

15. In the barbell defined in claim 7, the outer portion of the locking pin terminating in an end movable manually toward the locking sleeve to move the locking pin from its first position to its second position and away from the locking sleeve to move the locking pin from its second position to its first position.

16. In the barbell defined in claim 15, spring means biasing the locking pin to its first position.

* * * * *

UNITED STATES PATENT AND TRADEMARK OFFICE
CERTIFICATE OF CORRECTION

PATENT NO. : 4,955,603
DATED : September 11, 1990
INVENTOR(S) : HERMANN J. BECKER It is certified that error appears in the above-identified patent and that said Letters Patent is hereby corrected as shown below:

Title page: item [56], "2,796,296" should be --2,796,269--.

Claim 7: column 4, line 22, cancel "beign" and insert --being--.

Claim 9: column 4, line 29, cancel "compoennt" and insert --component--.

Signed and Sealed this

Fourth Day of February, 1992

Attest:

HARRY F. MANBECK, JR.

Attesting Officer      Commissioner of Patents and Trademarks